(12) United States Patent
Lee

(10) Patent No.: US 6,338,177 B1
(45) Date of Patent: Jan. 15, 2002

(54) WINDSHIELD WIPER FRAME WITH DECORATIVE STRIP

(76) Inventor: Shern-Yow Lee, No. 8-2, Kuo His Tzu, Kuan Yin Hsiang, Taoyuan Hsien (TW)

( * ) Notice: Subject to any disclaimer, the term of this patent is extended or adjusted under 35 U.S.C. 154(b) by 0 days.

(21) Appl. No.: 09/572,332

(22) Filed: May 18, 2000

(51) Int. Cl.$^7$ .................................................. B60S 1/38
(52) U.S. Cl. ............................. 15/250.201; 15/250.44; 15/250.001; 15/250.361; D12/220
(58) Field of Search ...................... 15/250.44, 250.361, 15/250.43, 250.451, 250.46, 250.001, 250.201; D12/219, 220

(56) References Cited

U.S. PATENT DOCUMENTS

| | | | | |
|---|---|---|---|---|
| 2,799,887 A | * | 7/1957 | Nemic | 15/250.201 |
| 3,234,578 A | * | 2/1966 | Golub et al. | 15/250.201 |
| D330,696 S | * | 11/1992 | Alain | D12/219 |
| 5,383,249 A | * | 1/1995 | Yang | 15/250.201 |
| 5,463,790 A | * | 11/1995 | Chiou et al. | 15/250.201 |
| 5,647,088 A | * | 7/1997 | Bommer et al. | 15/250.201 |

FOREIGN PATENT DOCUMENTS

GB 1156767 * 7/1969 .............. 15/250.44

\* cited by examiner

*Primary Examiner*—Gary K. Graham
(74) *Attorney, Agent, or Firm*—Rosenberg, Klein & Lee

(57) ABSTRACT

The present invention relates to a windshield wiper frame which contains recesses punched on the right and left ribs thereof while decoration strips are fixed in said recesses in order to enhance the beautiful whole appearance and the warning effect. Additionally, a closer contact of the wiper blade with the windshield can be achieved.

15 Claims, 7 Drawing Sheets

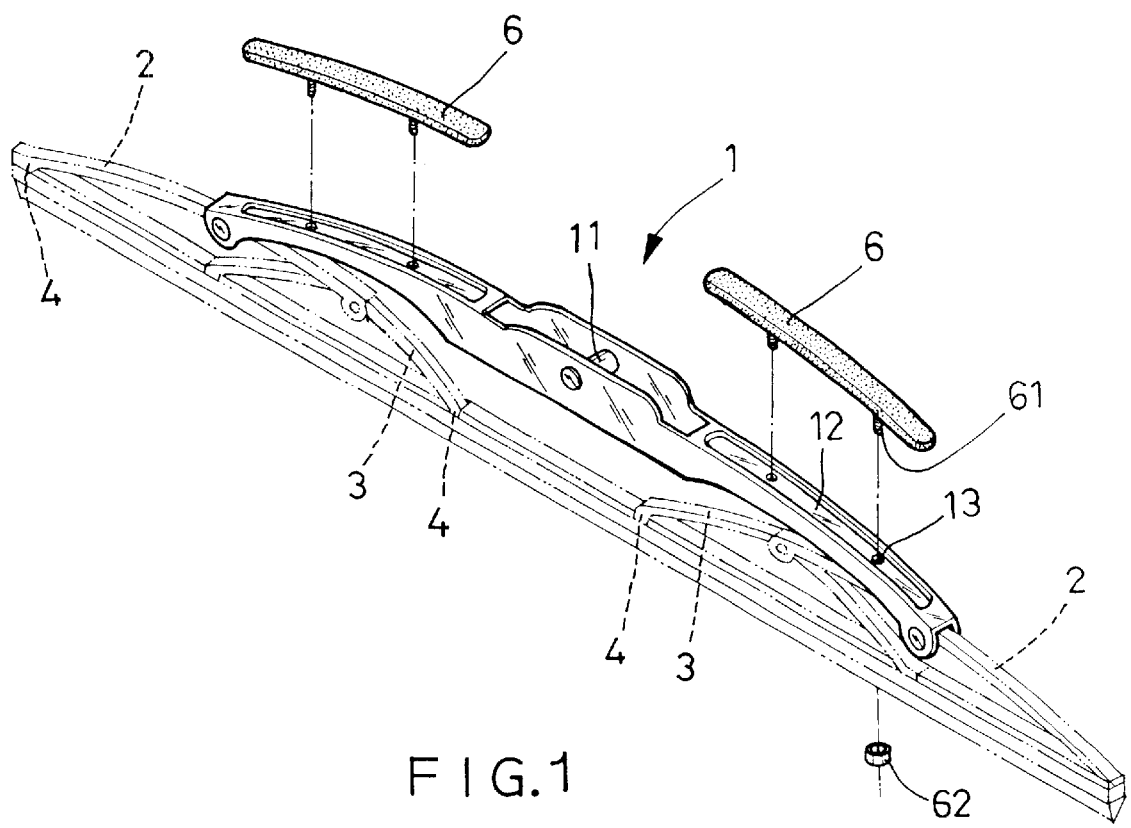
F I G. 1
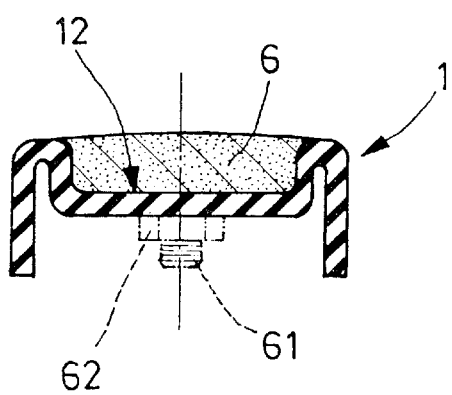
F I G. 2

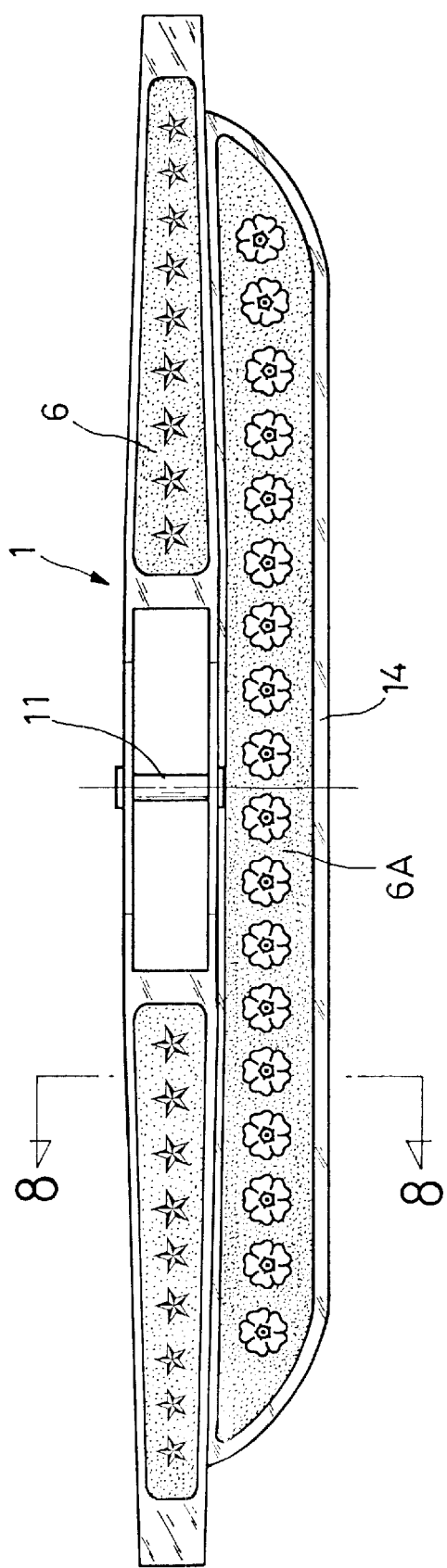
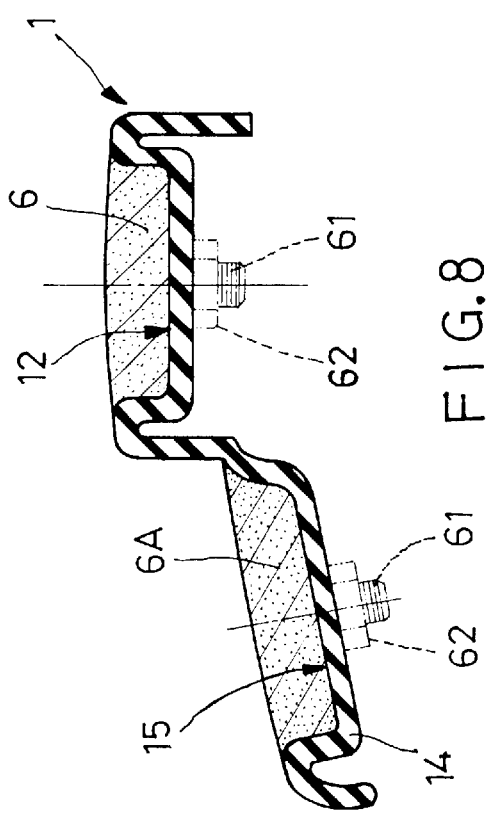
FIG.7
FIG.8

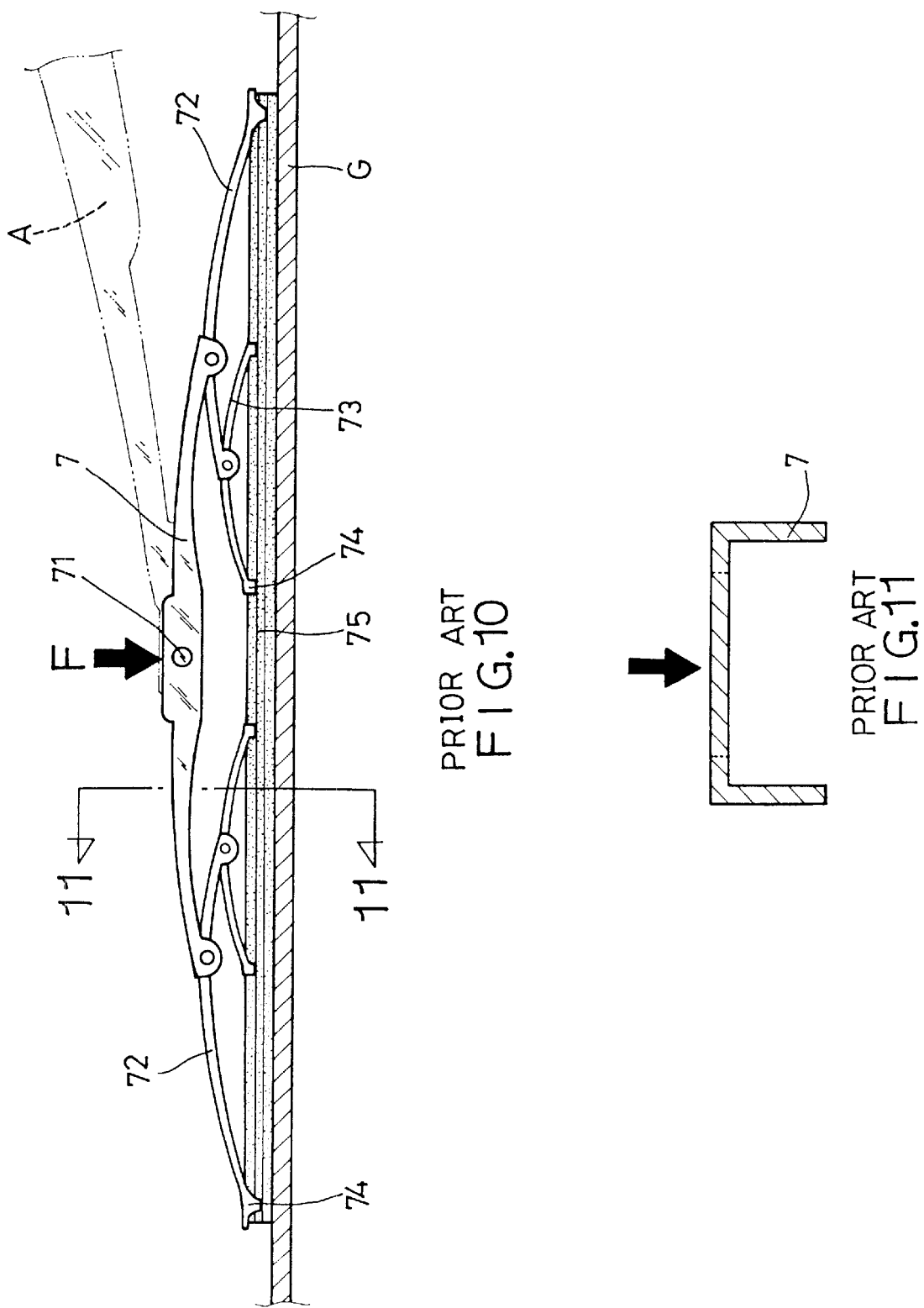

WINDSHIELD WIPER FRAME WITH DECORATIVE STRIP

BACKGROUND OF THE INVENTION

1. Field of the Invention

The present invention relates to an improvement of the windshield wiper frame, and more particularly, to a wiper blade having a well-distributed pressure on the surface of the windshield and an excellent contact therewith. Moreover, the surface of the windshield wiper looks more beautiful.

2. Description of the Prior Art

The frame 7 of a conventional windshield wiper, as shown in FIG. 9 and 10, is pivoted with two holders 72 at two ends thereof. Each of the holders 72 is pivoted with a connecting holder 73 at the inner side thereof. The outer side of each holder 72 and the two ends of each connecting holder 73 are fitted with a clamping piece 74 for securing a wiper blade 75. Each of the clamping pieces 74 is disposed in the same distance so that the wiper blade 75 obtains a well-distributed and close contact with the windshield (G). The pressure of the wiper blade 75 is created by a wiper arm (A) which is joined with the frame 7 by a mounting pin 71 whereby the pressure (F) is well-distributed to the holders 72 at two ends of the frame 7 and the clamping pieces 74 of the connecting holder 73. However, in the prior art windshield wiper, as shown in FIG. 11, the strength of the inverted U-shaped side structure in accordance with the material mechanics is not high. If the strength of the frame 7 in connection with the wiper arm (A) is insufficient, the pressure transmitted to the two ends of the frame 7 will be unbalanced. Therefore, the wiper blade 75 obtains an uneven pressure, and the close contact thereof with the windshield (G) will be influenced and the using life will be reduced.

The outer rim of the frame 7 of the conventional windshield wiper is a metal-punched strip, and it looks very cold and hard without novel and beautiful appearance. Moreover, it's a pity that it has no functions.

SUMMARY OF THE INVENTION

It is a primary object of the present invention to provide a windshield wiper frame which beautifies the whole appearance of the windshield wiper and enhances the warning effect.

It is another object of the present invention to provide a windshield wiper frame which enables the wiper blade to obtain a well-distributed pressure and an excellent contact with the windshield.

BRIEF DESCRIPTION OF THE DRAWINGS

The drawings disclose illustrative embodiments of the present invention which serve to exemplify the various advantages and objects hereof, and are as follows:

FIG. 1 is a perspective exploded view of a first applicable embodiment of the present invention;

FIG. 2 is a sectional view of the first applicable embodiment of the present invention;

FIG. 5 (B) is a top view of another applicable embodiment of the decoration strip of the present invention;

FIG. 7 is a top view of the second applicable embodiment of the present invention;

FIG. 8 is a sectional view of the second applicable embodiment of the present invention;

FIG. 10 is a side view of the conventional windshield wiper frame; and

FIG. 11 is a sectional view taken along the line of 11—11 of the windshield wiper frame of FIG. 10.

DETAILED DESCRIPTION OF THE PREFERRED EMBODIMENT

Figure 3:
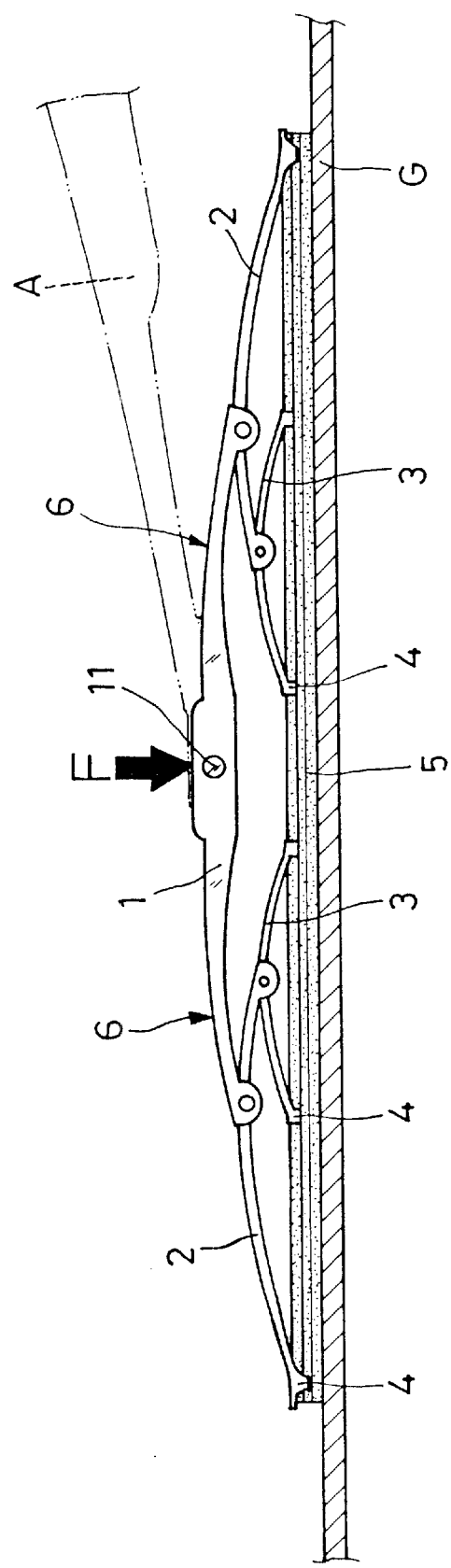
FIG. 3 is a side view of the present invention.

First of all, referring to FIG. 1 through 3, the windshield wiper frame in accordance with the present invention includes a frame 1, two holders 2, two connecting holders 3, two sets of clamping pieces 4 and a wiper blade 5 wherein the improvement is characterized in that:

the frame 1 having recesses 12 punched on the right and left ribs thereof, a decoration strip 6 fixed in the recess 12;

the decoration strip 6 being a light thin piece, made of plastic, PU-material or silicone and stuck in the recess 12 by means of the adhesive glue in order to integrate with the frame 1 as one body; alternatively, the decoration strip 6 having at least one screw 61 at the bottom rim thereof while the recess 12 is fitted with locking holes in order to receive the corresponding screws 61 to join with nuts 62 for fixing together.

Thereafter, referring to FIG. 2, the decoration strip 6 fixed in the recess 12 is parallel to the surface of the frame 1. It looks very beautiful. In addition, the recess 12 enhances the mechanical strength of the frame 1 without increase of the material thickness. Accordingly, the pressure (F) of the wiper arm (A) on the mounting pin 11, as shown in FIG. 3, can be well-distributed to the two ends of the frame 1, and thereafter to the wiper blade 5. The close contact of the wiper blade 5 with the windshield (G) can be achieved due to the even stress. Thus, the wiper blade 5 won't shake during the wiping operation and the rain can be effectively removed.

Figure 4:
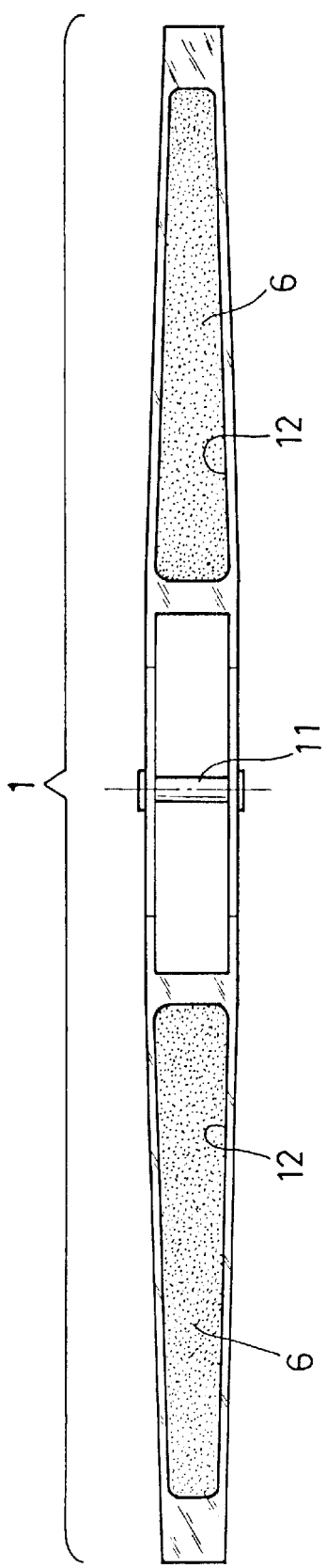
FIG. 4 is a top view of the first applicable embodiment of the present invention.
Figure 5A:
FIG. 5 (A) is a top view of an applicable embodiment of a decoration strip of the present invention.
Figure 5B:

Referring to FIG. 4, 5 (A) and 5 (B), in addition that the strength of the frame 1 in accordance with the present invention is increased by means of the recess 12, the frame 1 makes use of the decoration strip 6 fixed in the recess 12 so that the whole wiper blade shows completely different and has a beautiful appearance. Especially, the decoration strip 6 can be designed to be fluorescent so that the wiper blade 5 provides with a warning effect for the coming cars during the wiping operation and, more particularly, in rainy or cloudy days. Furthermore, the decoration strip 6, as shown in FIG. 5 (A) and 5 (B), is provided with all kinds of figures, such as stars, flowers, animals, plants or figures from cartoon on the surface or within the transparent sandwich thereof in order to enhance the whole beauty.

Figure 6:
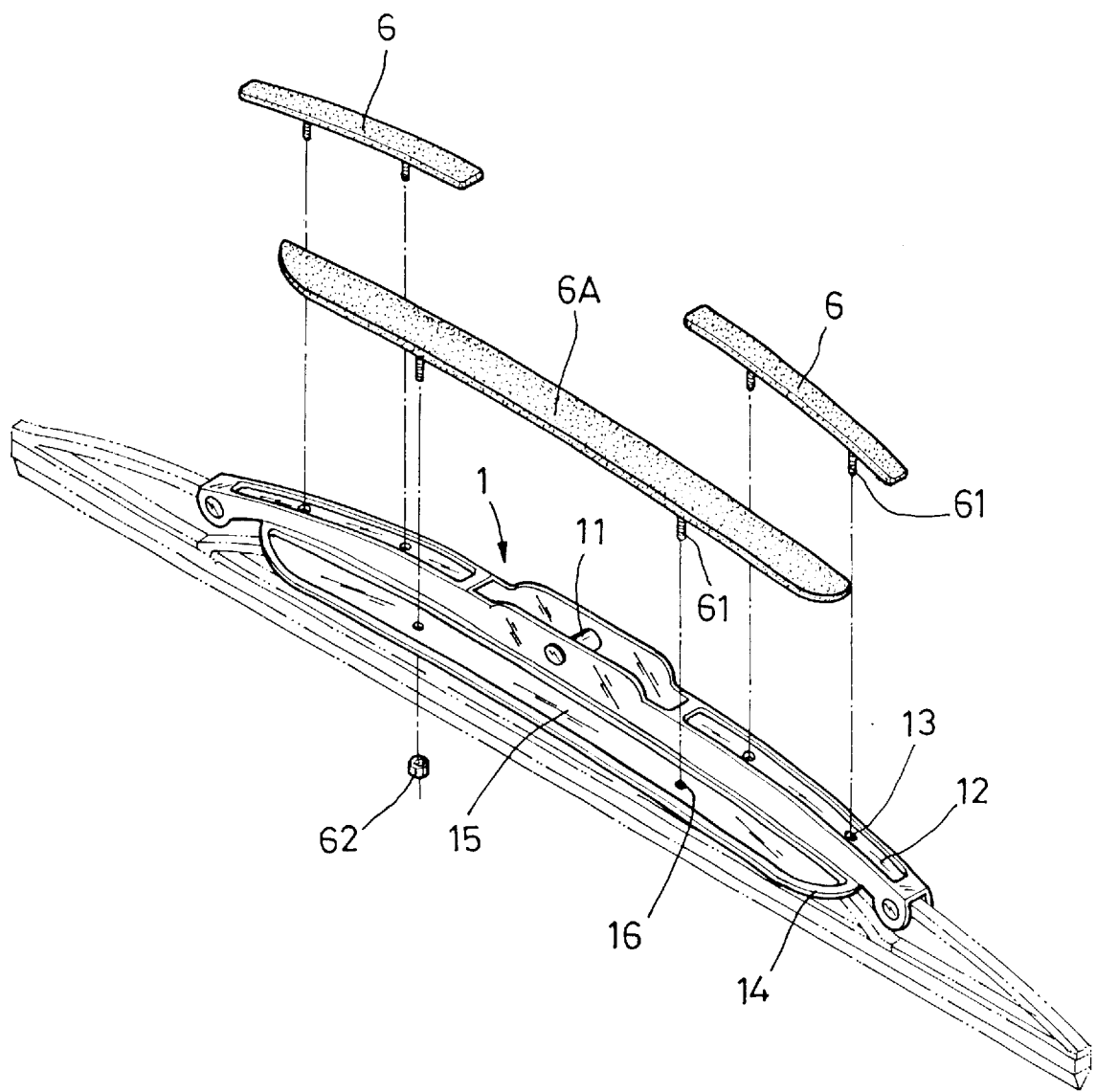
FIG. 6 is a perspective exploded view of a second applicable embodiment of the present invention.
Figure 9:
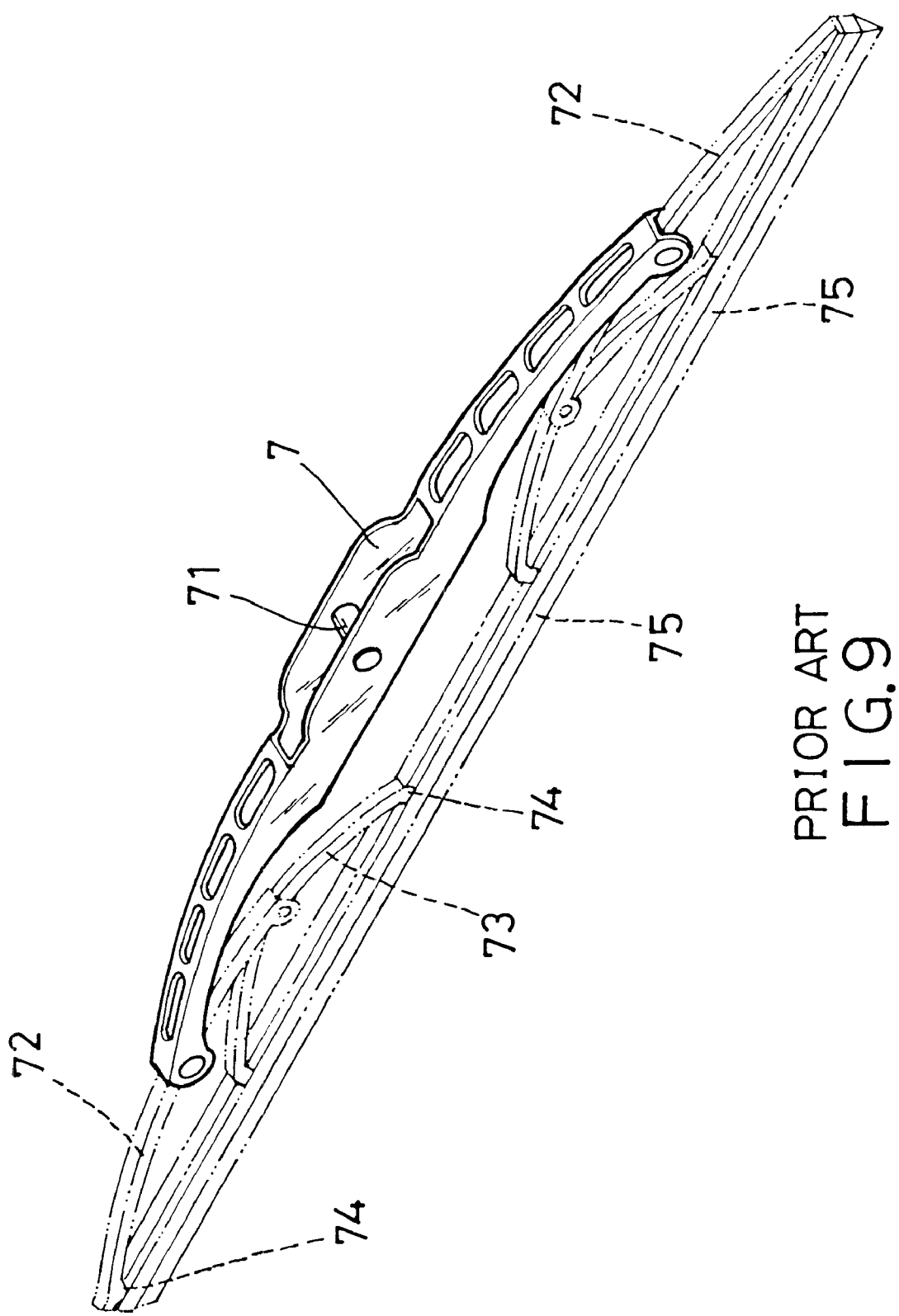
FIG. 9 is a perspective view of a conventional windshield wiper frame.

The frame 1, as shown in FIG. 6, 7 and 8, includes an extension flap 14 in front thereof which is used for enhancing the downward pressure of the wiper blade. The extension flap 14 makes use of the action area of the wind pressure when the car drives in order to enhance the close contact of the wiper blade 5 with the windshield. However, the conventional extension flap and the frame are formed in a flat shape so that they are extremely weak in strength and are easily deformed under strong wind so that the using life is reduced. Formed as the first (last) embodiment, the extension flap 14 is also punched with a recess 15 on the surface thereof in which locking holes 16 are provided in order to receive screws 61 at bottom end rim of the decoration strips 6A to join with nuts 62 for fixing together. Also, the fixing can be directly carried out by means of the adhesive glue.

The recess 12 of the frame 1 and the recess 15 of the extension flap 14, as shown in FIG. 7 and 8, enhance the strength of the frame 1 while the decoration strips 6, 6A are respectively mounted in the recesses 12, 15 so that the strength and the beauty are integrated and the warning effect is created for the coming cars.

Furthermore, the decoration strips 6, 6A are fixed in the recess 12, 15 by means of screws 61, and their figures and colors can be changed in accordance with the real demand or in compliance to the whole body of the car.

Many changes and modifications in the above-described embodiments of the invention can, of course, be carried out without departing from the scope thereof. Accordingly, to promote the progress in science and the useful arts, the invention is disclosed and is intended to be limited only by the scope of the appended claims.

What is claimed is:

1. A windshield wiper frame comprising:
   at least one rib portion having a longitudinally extended surface and a recess having a predetermined contour formed in said longitudinally extended surface;
   at least one decoration strip received in said recess of said rib portion, said decoration strip substantially filling said recess and defining an upper surface disposed in substantially flush manner relative to said longitudinally extended surface of said rib portion, said decoration strip including visual indicia applied to at least a portion thereof; and,
   means for immovably affixing said decoration strip in said recess of said rib portion.

2. The windshield wiper frame as recited in claim 1 comprising at least a pair of said rib portions extending collinearly from opposing left and right sides of an intermediate portion.

3. The windshield wiper frame as recited in claim 1 wherein said decoration strip is formed of a resilient material.

4. The windshield wiper frame as recited in claim 3 wherein said decoration strip is formed of a plastic material.

5. The windshield wiper frame as recited in claim 1 wherein said visual indicia of said decoration strip includes a fluorescent color.

6. The windshield wiper frame as recited in claim 1 wherein said visual indicia of said decoration strip includes a graphic pattern.

7. The windshield wiper frame as recited in claim 1 wherein said means for affixing includes an adhesive material applied on said decoration strip.

8. The windshield wiper frame as recited in claim 1 wherein said means for affixing includes a fastening nut threadedly coupled to a portion of said decoration strip extending through said rib portion.

9. A windshield wiper frame comprising:
   a pair of rib portions extending longitudinally from opposing left and right sides of an intermediate portion, each said rib portion having a longitudinally extended surface and a recess formed in said longitudinally extended surface;
   an extension flap portion projecting laterally from said intermediate portion, said extension flap portion having an extension surface and an extension recess formed in said extension surface;
   a pair of first decoration strips respectively received in said recesses of said rib portion, each said first decoration strip substantially filling one said recess and defining an upper surface disposed in substantially flush manner relative to said longitudinally extended surface of one said rib portion, each said first decoration strip including visual indicia applied to at least a portion thereof;
   at least one second decoration strip received in said extension recess of said extension flap portion, said second decoration strip substantially filling said extension recess and defining an upper surface disposed in substantially flush manner relative to said extension surface of said extension flap portion, said second decoration strip including visual indicia applied to at least a portion thereof; and,
   means for affixing each of said first and second decoration strips respectively in said recesses and extension recess.

10. The windshield wiper frame as recited in claim 9 wherein each of said first and second decoration strips is formed of a resilient material.

11. The windshield wiper frame as recited in claim 10 wherein each of said first and second decoration strips is formed of a plastic material.

12. The windshield wiper frame as recited in claim 9 wherein said visual indicia of each of said first and second decoration strips includes a fluorescent color.

13. The windshield wiper frame as recited in claim 9 wherein said visual indicia of each of said first and second decoration strips includes a graphic pattern.

14. The windshield wiper frame as recited in claim 9 wherein said means for affixing includes an adhesive material applied on each of said first and second decoration strips.

15. The windshield wiper frame as recited in claim 9 wherein said means for affixing includes a plurality of fastening nuts coupled in threaded manner to portions of said first and second decoration strips extending respectively through said rib and extension flap portions.

* * * * *